(12) United States Patent
Komiya et al.

(10) Patent No.: US 6,429,276 B1
(45) Date of Patent: Aug. 6, 2002

(54) PROCESS AND POLYMERIZER FOR PRODUCING AROMATIC POLYCARBONATE

(75) Inventors: Kyosuke Komiya; Shinsuke Fukuoka, both of Kurashiki (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/530,916

(22) PCT Filed: Jan. 14, 1999

(86) PCT No.: PCT/JP99/00114

§ 371 (c)(1),
(2), (4) Date: May 8, 2000

(87) PCT Pub. No.: WO99/36457

PCT Pub. Date: Jul. 22, 1999

(30) Foreign Application Priority Data

Jan. 14, 1998 (JP) ............................................ 10-005878

(51) Int. Cl.[7] .............................................. C08G 64/00
(52) U.S. Cl. ....................................... 528/196; 528/198
(58) Field of Search ................................. 528/196, 198

(56) References Cited

U.S. PATENT DOCUMENTS 3,634,042 A  1/1972  McCown
3,888,826 A  6/1975  Yamana et al.
5,589,564 A  12/1996  Komiya et al.
5,677,415 A  10/1997  Bhatia

FOREIGN PATENT DOCUMENTS

GB   1007302    10/1965
JP   8-283417   10/1996

*Primary Examiner*—Terressa M. Boykin
(74) *Attorney, Agent, or Firm*—Birch, Stewart, Kolasch & Birch, LLP (57) ABSTRACT

Disclosed is a method for producing an aromatic polycarbonate, comprising: feeding, into a polymerizer apparatus, at least one polymerizable material selected from the group consisting of a molten monomer mixture of an aromatic dihydroxy compound and a diaryl carbonate, and a molten prepolymer obtained by a process comprising reacting an aromatic dihydroxy compound with a diaryl carbonate, the polymerizer apparatus including a guide-wetting fall polymerization reaction zone which has at least one guide securely held therein and extending downwardly therethrough, and allowing the polymerizable material to fall along and in contact with the at least one guide through the guide-wetting fall polymerization reaction zone, to effect a guide-wetting fall polymerization of the polymerizable material, thereby obtaining a polymer, wherein the guide is a perforated wall-surface guide. Also disclosed is a polymerizer apparatus for practicing the above-mentioned method.

9 Claims, 2 Drawing Sheets

PROCESS AND POLYMERIZER FOR PRODUCING AROMATIC POLYCARBONATE

This application is the national phase under 35 U.S.C. § 371 of PCT International Application No. PCT/JP99/00114 which has an International filing date of Jan. 14, 1999, which designated the United States of America.

BACKGROUND OF THE INVENTION

1. Field of the Invention

The present invention relates to a method for producing an aromatic polycarbonate. More particularly, the present invention is concerned with a method for producing an aromatic polycarbonate, comprising: feeding, into a polymerizer apparatus, at least one polymerizable material selected from the group consisting of a molten monomer mixture of an aromatic dihydroxy compound and a diaryl carbonate, and a molten prepolymer obtained by a process comprising reacting an aromatic dihydroxy compound with a diaryl carbonate, the polymerizer apparatus including a guide-wetting fall polymerization reaction zone which has at least one guide securely held therein and extending downwardly therethrough, and allowing the polymerizable material to fall along and in contact with the at least one guide through the guide-wetting fall polymerization reaction zone, to effect a guide-wetting fall polymerization of the polymerizable material, thereby obtaining a polymer, wherein the guide is a perforated wall-surface guide. The present invention is also concerned with a polymerizer apparatus for practicing the above-mentioned method.

The method of the present invention for producing an aromatic polycarbonate is free from the problems accompanying the conventional method: such as the problem that phenol cannot be removed efficiently; the problem that a very large motive power for agitation is needed; the problem that the molecular chain of a polymer being formed is broken by a large shearing force due to the very large motive power for agitation, resulting not only in a reduced rate of increasing molecular weight but also in a discoloration of the polymer. Also, there is the problem that the polymer is likely to suffer thermal decomposition due to a long-term thermal history, thereby inevitably causing the polymer being produced to contain thermal decomposition products, and there is the problem that the volumetric efficiency of a polymerizer is extremely low.

By the method of the present invention, an aromatic polycarbonate having a desired constant molecular weight can be stably produced at a high polymerization rate, without discoloration with respect to the polymer or generation of foreign matter. Therefore, the method of the present invention is advantageous from a commercial viewpoint.

2. Prior Art

In recent years, aromatic polycarbonates have been widely used in various fields as engineering plastics having excellent heat resistance, impact resistance and transparency. With respect to methods for producing aromatic polycarbonates, various studies have heretofore been made. Of the methods studied, a process utilizing an interfacial polycondensation between an aromatic dihydroxy compound, such as 2,2-bis(4-hydroxyphenyl)propane (hereinafter, frequently referred to as "bisphenol A"), and phosgene has been commercially practiced.

However, the interfacial polycondensation process has problems. First, it is necessary to use phosgene, which is poisonous. Second, the reaction apparatus is likely to be corroded with chlorine-containing compounds, such as hydrogen chloride and sodium chloride (which are by-produced) and methylene chloride (which is used as a solvent in a large quantity). Third, difficulties are encountered in separating and removing impurities, such as sodium chloride, and the residual methylene chloride, which adversely affect properties of a produced polymer.

With respect to a method for producing an aromatic polycarbonate from an aromatic dihydroxy compound and a diaryl carbonate, a transesterification process has conventionally been known, in which a polycarbonate is produced by performing an ester exchange reaction between bisphenol A and diphenyl carbonate in the molten state, while removing a by-produced phenolic compound (such as phenol). Unlike the interfacial polycondensation process, the transesterification process has an advantage in that a solvent need not be used. However, the transesterification process has a serious problem, namely; since the viscosity of a polymer being formed increases during the progress of the polymerization reaction, it becomes difficult to remove by-produced phenol from the polymerization reaction system efficiently, thus making it difficult to achieve a high degree of polymerization with respect to the polycarbonate produced.

Various polymerizers have been conventionally used in producing aromatic polycarbonates by the transesterification process. A vertical agitation type polymerizer vessel equipped with an agitator is widely used. The vertical agitation type polymerizer vessel equipped with an agitator is advantageous in that it exhibits high volumetric efficiency and has a simple construction, so that polymerization on a small scale can be efficiently carried out. However, the vertical agitation type polymerizer vessel has a problem in that, as mentioned above, the by-produced phenol becomes difficult to remove from the polymerization reaction system efficiently in the production of aromatic polycarbonates on a commercial scale, so that the polymerization rate becomes extremely low.

Specifically, a large-scale vertical agitation type polymerizer vessel generally has a greater ratio of liquid volume to vaporization area than a small-scale one. In other words, the depth of a reaction mixture in the polymerizer is large and, hence, the pressure in the lower part of the agitation vessel is large. In such a case, even if the degree of vacuum of the polymerization reaction zone is raised in order to achieve a high degree of polymerization in the lower part of the agitation vessel, the polymerization proceeds under virtually high pressure due to the weight of the reaction mixture, so that phenol and the like cannot be efficiently removed.

To solve the above-mentioned problem, various attempts have been made to remove phenol and the like from high viscosity polymer being formed. For example, Examined Japanese Patent Application Publication No. 50-19600 (corresponding to GB-1 007 302) discloses the use of a screw type polymerizer having a vent. Examined Japanese Patent Application Publication No. 52-36159 discloses the use of an intermeshing twin-screw extruder. Examined Japanese Patent Application Publication No. 53-5718 (corresponding to U.S. Pat. No. 3,888,826) describes a thin film evaporation type reactor, such as a screw evaporator and a centrifugal film evaporator. Further, Unexamined Japanese Patent Application Laid-Open Specification No. 2-153923 discloses a method in which a combination of a centrifugal film evaporator and a horizontal agitation type polymerizer vessel is used.

Of these polymerizers, horizontal polymerizers, such as a screw evaporator and a horizontal agitation type polymerizer vessel, are intended to increase, by rotary agitation, the surface renewal of polymer (being formed) to a level as high as possible in an attempt to remove phenol and the like efficiently. For example, Examined Japanese Patent Application Publication No. 50-19600 describes that "A relatively large, continuously renewing interface is formed between the liquid reaction system and the ambient gas or vapor, so that a volatile reaction product formed in the liquid reaction system is extremely smoothly removed." (see page 1, right-hand column, lines 19 to 22 of the above patent document). That is, the above patent document suggests that phenol and the like can be efficiently removed by the renewal of gas-liquid interface. Further, in Examined Japanese Patent Application Publication No. 52-36159, surface renewal effect "J" is defined as a function of the screw revolution rate, the screw surface area in the reaction zone, the total screw pitch number in the reaction zone, the feed amount of raw material and the effective volume per screw pitch in the reaction zone, and it is described that it is important that the value of the surface renewal effect be in a specific range.

However, these horizontal polymerizers need rotary agitation force provided by, for example, a screw or an agitator, for increasing the surface renewal. It should be noted that the viscosity of an aromatic polycarbonate being formed increases extremely in accordance with the increase in the molecular weight thereof during the polymerization reaction, so that an extremely large agitation force becomes necessary. In addition, when a large agitation force is exerted on a polymer having a high viscosity, the polymer sustains a large shearing force and, hence, breakage of the molecular chain occurs, so that the increasing rate of the molecular weight becomes low, making it impossible to obtain an aromatic polycarbonate having a high molecular weight. Further, when an aromatic polycarbonate sustains a large shearing force, a discoloration of the polycarbonate occurs, so that the quality of the aromatic polycarbonate is seriously adversely affected. Furthermore, when the production of an aromatic polycarbonate by using an agitation type polymerizer is performed on a commercial scale, the size of the agitation type polymerizer is inevitably limited. This is due to the fact that when there is an increase in the size of the agitation type polymerizer, it is necessary to increase the strength of the agitator and the motive power for agitation; however, there are limits to this increase in strength and motive power. Therefore, with the use of an agitation type polymerizer, the production amount of the aromatic polycarbonate cannot be easily increased. That is, agitation type polymerizers also have a problem in that a scale-up of the production of an aromatic polycarbonate is difficult.

With respect to centrifugal film evaporators, Unexamined Japanese Patent Application Laid-Open Specification No. 2-153923 has a description to the effect that, by using a centrifugal film evaporator as a polycondensation reactor in the final stage of a transesterification reaction, the evaporation surface area of the liquid reaction system per unit weight of the liquid reaction system can be increased, thereby enabling a decrease in the residence time of the liquid reaction system in the reactor. However, the above patent document also points out the following problems. That is, when a centrifugal film evaporator is used, a part of the polymer being formed sticks to the surfaces of the driving shaft, the blade, the bearing for the driving shaft, and the like, and is exposed to a thermal environment for a long period of time, so that the part of the polymer sticking to the surfaces is decomposed to form a black decomposition product, and the black decomposition product undesirably enters the polymer being produced. In order to obviate this problem, the above patent document discloses a method in which a centrifugal film evaporator is used in the middle stage of the transesterification reaction, but not in the final stage of the reaction. However, in this method, a film of polymer is formed only on the inner wall surface of the evaporator and, hence, the volumetric efficiency of the evaporator as a polymerizer is extremely low, so that a satisfactory reaction time cannot be obtained without using a reactor which is too large. Thus, the centrifugal film evaporator cannot be suitably used on a commercial scale.

With respect to a polymerizer having no rotary agitator, Examined Japanese Patent Application Publication No. 48-8355 discloses a polymerizer for producing a polyester or a polyamide, wherein the polymerizer comprises a cylindrical reactor casing and a porous body disposed therein and extending substantially vertically, wherein the cylindrical reactor casing is equipped with a heater, a polymerizable material distribution device positioned above the porous body, a polymerization product discharging device positioned below the porous body, and a device for removing gas generated from a reaction mixture produced in the polymerizer, and wherein the porous body has a void ratio distribution which increases from the upper end thereof to the lower end thereof. However, in this document, there is no disclosure about a production of an aromatic polycarbonate, that is, there is no disclosure as to how to make it possible to stably produce an aromatic polycarbonate having a desired constant molecular weight at a high polymerization rate, without discoloration with respect to the polymer or generation of foreign matter.

As described hereinabove, in the production of an aromatic polycarbonate by the transesterification process (which is free from the problem that impurities and residual methylene chloride are contained in the produced polycarbonate and these unfavorable substances cannot be completely removed therefrom), when the transesterification process is performed by the conventional production methods using a vertical agitation type polymerizer, a horizontal agitation type polymerizer, a centrifugal film evaporator, or the like, various problems arise. For example, phenol cannot be removed efficiently; a very large motive power for agitation is needed; the molecular chain of a polymer being formed is broken by the shearing force due to the very large motive power for agitation, resulting in a lowering of the increasing rate of the molecular weight and in a discoloration of the polymer; a thermal decomposition product of a polymer is generated due to a longterm thermal history, which undesirably enters the polymer being produced; the volumetric efficiency of a polymerizer is extremely low; and a scale-up of the production of an aromatic polycarbonate is difficult.

As a solution to these problems, in U.S. Pat. No. 5,589,564, the present inventors disclosed that a high quality aromatic polycarbonate can be produced at a high polymerization rate by a method in which a polymerizable material is allowed to fall along and in contact with a wire to thereby effect a polymerization reaction. However, it have been desired to develop a method which enables an aromatic polycarbonate having a desired constant molecular weight to be stably produced at a higher polymerization rate.

As apparent from the above, a commercially advantageous method for producing an aromatic polycarbonate has been desired, wherein the method is free from the above-mentioned problems accompanying the conventional methods and enables an aromatic polycarbonate having a desired constant molecular weight to be stably produced at a high polymerization rate, without discoloration a with respect to the polymer or generation of foreign matter.

SUMMARY OF THE INVENTION

In this situation, the present inventors have conducted extensive and intensive studies with a view toward solving the above-mentioned problems. As a result, it has unexpectedly been found that the above-mentioned objective can be attained by a method which comprises: feeding, into a polymerizer apparatus, at least one polymerizable material selected from the group consisting of a molten monomer mixture of an aromatic dihydroxy compound and a diaryl carbonate, and a molten prepolymer obtained by a process comprising reacting an aromatic dihydroxy compound with a diaryl carbonate, the polymerizer apparatus including a guide-wetting fall polymerization reaction zone which has at least one guide securely held therein and extending downwardly therethrough, and allowing the polymerizable material to fall along and in contact with the at least one guide through the guide-wetting fall polymerization reaction zone, to effect a guide-wetting fall polymerization of the polymerizable material, thereby obtaining a polymer, wherein a perforated wall-surface guide is used as the guide. The perforated wall-surface guide has a plurality of through-holes, each extending substantially in the thicknesswise direction of the wall-surface guide, to thereby form openings in both surfaces of the wall-surface guide. Based on this novel finding, the present invention has been completed.

Therefore, it is an object of the present invention to provide a commercially advantageous method for producing an aromatic polycarbonate, which is free from the above-mentioned problems accompanying the conventional methods and enables an aromatic polycarbonate having a desired constant molecular weight to be stably produced at a high polymerization rate, without discoloration with respect to the polymer or generation of foreign matter.

It is another object of the present invention to provide a polymerizer apparatus for practicing the above-mentioned method.

The foregoing and other objects, features and advantages of the present invention will become apparent from the following detailed description and appended claims taken in connection with the accompanying drawings.

BRIEF DESCRIPTION OF THE DRAWINGS

In the drawings:

FIG. 3($a$) is a diagrammatic cross-sectional view of one form of the polymerizer for practicing the method of the present invention, as viewed from the front of the polymerizer; and FIG. 3($b$) is another diagrammatic cross-sectional view of the polymerizer of FIG. 3($a$), as viewed from above the polymerizer.

DESCRIPTION OF REFERENCE NUMERALS

1 Net type wall-surface guide
2$a$, 2$b$ Surfaces on which a molten prepolymer is to fall down
3$a$, 3$b$ Openings
4 Punched-plate type wall-surface guide
5 Polymerizer apparatus
6 Inlet
7 Distributing plate
8 Hole
9 Vent
10 Discharging pump
11 Outlet

DETAILED DESCRIPTION OF THE INVENTION

In one aspect of the present invention, there is provided a method for producing an aromatic polycarbonate which comprises:

feeding, into a polymerizer apparatus, at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, the polymerizer apparatus comprising an inlet for the polymerizable material, a polymerizable material feeding zone communicating with the inlet, and a guide-wetting fall polymerization reaction zone which is positioned below and communicates with the polymerizable material feeding zone, wherein the guide-wetting fall polymerization reaction zone has at least one guide securely held therein and extending downwardly therethrough, and allowing the polymerizable material to fall along and in contact with the at least one guide through the guide-wetting fall polymerization reaction zone, to effect a guide-wetting fall polymerization of the polymerizable material, thereby obtaining a polymer at a bottom of the guide-wetting fall polymerization reaction zone, wherein the guide is a perforated wall-surface guide, the perforated wall-surface guide having a plurality of through-holes, each extending substantially in the thicknesswise direction of the wall-surface guide, to thereby form openings in both surfaces of the wall-surface guide.

In another aspect of the present invention, there is provided a polymerizer apparatus for producing an aromatic polycarbonate, which comprises a casing and, provided therein, an inlet for a polymerizable material, a polymerizable material feeding zone communicating with the inlet, and a guide-wetting fall polymerization reaction zone which is positioned below and communicates with the polymerizable material feeding zone, wherein the guide-wetting fall polymerization reaction zone has at least one guide securely held therein and extending downwardly therethrough, wherein the inlet is adapted to receive at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, and wherein the polymerizable material is adapted to be fed to the polymerizable material feeding zone through the inlet, and transferred to enter the guide-wetting fall polymerization reaction zone through the polymerizable material feeding zone and fall along and in contact with the guide, to effect a guide-wetting fall polymerization of the polymerizable material to obtain a polymer, the guide-wetting fall polymerization reaction zone having, at a bottom thereof, an outlet for the obtained polymer, wherein the guide is a perforated wall-surface guide,
the perforated wall-surface guide having a plurality of through-holes, each extending substantially in the thicknesswise direction of the wall-surface guide, to thereby form openings in both surfaces of the wall-surface guide.

For an easy understanding of the present invention, the essential features and various preferred embodiments of the present invention are enumerated below.

1. A method for producing an aromatic polycarbonate, which comprises:
feeding, into a polymerizer apparatus, at least one polymerizable material selected from the group consisting of:
a molten monomer mixture of an aromatic dihydroxy compound and a diaryl carbonate, and
a molten prepolymer produced by a process comprising reacting an aromatic dihydroxy compound with a diaryl carbonate,
the polymerizer apparatus comprising an inlet for the polymerizable material, a polymerizable material feeding zone communicating with the inlet, and a guide-wetting fall polymerization reaction zone which is positioned below and communicates with the polymerizable material feeding zone, wherein the guide-wetting fall polymerization reaction zone has at least one guide securely held therein and extending downwardly therethrough, and
allowing the polymerizable material to fall along and in contact with the at least one guide through the guide-wetting fall polymerization reaction zone, to effect a guide-wetting fall polymerization of the polymerizable material, thereby obtaining a polymer at a bottom of the guide-wetting fall polymerization reaction zone,
wherein the guide is a perforated wall-surface guide,
the perforated wall-surface guide having a plurality of through-holes, each extending substantially in the thicknesswise direction of the wall-surface guide, to thereby form openings in both surfaces of the wall-surface guide.

2. The method according to item 1 above, wherein the wall-surface guide satisfies the following formula (1):

$$S_1/S_0 \geq 0.15 \tag{1}$$

wherein:
$S_0$ represents the total area of both surfaces of the wall-surface guide, as measured without perforation; and
$S_1$ represents the total area of the openings in both surfaces of the wall-surface guide.

3. The method according to item 1 or 2 above, wherein each of the openings in both surfaces of the wall-surface guide independently has an area in the range of from 0.01 to 300 cm$^2$.

4. The method according to any one of items 1 to 3 above, wherein the wall-surface of the wall-surface guide is at least one surface selected from the group consisting of a flat surface and a curved surface.

5. A polymerizer apparatus for producing an aromatic polycarbonate, which comprises a casing and, provided therein, an inlet for a polymerizable material, a polymerizable material feeding zone communicating with the inlet, and a guide-wetting fall polymerization reaction zone which is positioned below and communicates with the polymerizable material feeding zone, wherein the guide-wetting fall polymerization reaction zone has at least one guide securely held therein and extending downwardly therethrough,
wherein the polymerizable material is at least one member selected from the group consisting of:
a molten monomer mixture of an aromatic dihydroxy compound and a diaryl carbonate, and
a molten prepolymer produced by a process comprising reacting an aromatic dihydroxy compound with a diaryl carbonate,
and wherein when the polymerizable material is introduced to the inlet, the polymerizable material is fed to the polymerizable material feeding zone, and transferred to enter the guide-wetting fall polymerization reaction zone through the polymerizable material feeding zone and fall along and in contact with the guide, to effect a guide-wetting fall polymerization of the polymerizable material to obtain a polymer,
the guide-wetting fall polymerization reaction zone having, at a bottom thereof, an outlet for the obtained polymer,
wherein the guide is a perforated wall-surface guide,
the perforated wall-surface guide having a plurality of through-holes, each extending substantially in the thicknesswise direction of the wall-surface guide, to thereby form openings in both surfaces of the wall-surface guide.

6. The polymerizer apparatus according to item 5 above, wherein the polymerizable material feeding zone and the guide-wetting fall polymerization reaction zone are separated from each other through a polymerizable material distributing plate having at least one hole, the feeding zone communicating with the guide-wetting fall polymerization reaction zone through the at least one hole, and wherein the guide is arranged in correspondence with the hole of the distributing plate.

7. The polymerizer apparatus according to item 5 or 6 above, wherein the wall-surface guide satisfies the following formula (1):

$$S_1/S_0 \geq 0.15 \tag{1}$$

wherein:
$S_0$ represents the total area of both surfaces of the wall-surface guide, as measured without perforation; and
$S_1$ represents the total area of the openings in both surfaces of the wall-surface guide.

8. The polymerizer apparatus according to any one of items 5 to 7 above, wherein each of the openings in both surfaces of the wall-surface guide independently has an area in the range of from 0.01 to 300 cm$^2$.

9. The polymerizer apparatus according to any one of items 5 to 8 above, wherein the wall-surface of the wall-surface guide is at least one surface selected from the group consisting of a flat surface and a curved surface.

In conventional methods for producing an aromatic polycarbonate by the transesterification process, for removing by-produced phenol and the like from the liquid reaction system efficiently, it has been attempted to increase the surface renewal of the polymer (being formed) by a very powerful rotary agitation, using horizontal polymerizers as mentioned above. However, it has surprisingly been found that, by the method of the present invention, a high quality aromatic polycarbonate can be obtained at a high polymerization rate without a need for a rotary agitation. This is one of the major aspects of the advantages of the present invention. Further, it has also been found that the method of the present invention provides an advantage in that an aromatic polycarbonate having a desired constant molecular weight can be stably produced at a high polymerization rate, as compared to the case of the use of the conventional methods in which a wire or a non-perforated plate is used as a guide. This is another major aspect of the advantages of the present invention.

Hereinbelow, the present invention will be described in more detail.

In the present invention, the term "aromatic dihydroxy compound" means a compound represented by the following formula:

HO—Ar—OH wherein Ar represents a divalent aromatic group.

Preferred examples of divalent aromatic groups as Ar include a group represented by the following formula:

—Ar$^1$—Y—Ar$^2$— wherein each of Ar$^1$ and Ar$^2$ independently represents a divalent carbocyclic or heterocyclic aromatic group having from 5 to 70 carbon atoms, and Y represents a divalent alkane group having from 1 to 30 carbon atoms.

In divalent carbocyclic or heterocyclic aromatic groups as Ar$^1$ and Ar$^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Illustrative examples of heterocyclic aromatic groups as Ar$^1$ and Ar$^2$ include an aromatic group having at least one hetero atom, such as a nitrogen atom, an oxygen atom or a sulfur atom.

Examples of divalent aromatic groups as Ar$^1$ and Ar$^2$ include an unsubstituted or substituted phenylene group, an unsubstituted or substituted biphenylene group and an unsubstituted or substituted pyridylene group. Substituents for Ar$^1$ and Ar$^2$ are as described above.

Examples of divalent alkane groups as Y include organic groups respectively represented by the following formulae:

wherein each of R$^1$, R$^2$, R$^3$ and R$^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl-group having from 6 to 10 ring-forming carbon atoms; k represents an integer of from 3 to 11; each X represents a carbon atom and has R$^5$ and R$^6$ bonded thereto; each R$^5$ independently represents a hydrogen atom or an alkyl group having from 1 to 6 carbon atoms, and each R$^6$ independently represents a hydrogen atom or an alkyl group having from 1 to 6 carbon atoms, wherein R$^5$ and R$^6$ are the same or different; wherein at least one hydrogen atom of each of R$^1$, R$^2$, R$^3$, R$^4$, R$^5$ and R$^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Specific examples of divalent aromatic groups as Ar include groups respectively represented by the following formulae:

-continued wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, the $R^7$'s are the same or different, and when n is an integer of from 2 to 4, the $R^8$'s are the same or different.

Further, examples of divalent aromatic groups as Ar also include those which are represented by the following formula:

wherein $Ar^1$ and $Ar^2$ are as defined above; and Z represents a single bond or a divalent group, such as —O—, —CO—, —S—, —SO$_2$—, —SO—, —COO—, or —CON(R$^1$)—, wherein $R^1$ is as defined above.

Examples of such divalent aromatic groups as Ar include groups respectively represented by the following formulae:

wherein $R^7$, $R^8$, m and n are as defined above.

Further examples of divalent aromatic group Ar include an unsubstituted or substituted phenylene, an unsubstituted or substituted naphthylene, and an unsubstituted or substituted pyridylene.

In the method of the present invention, the aromatic dihydroxy compounds can be used individually or in combination. Representative examples of aromatic dihydroxy compounds include bisphenol A.

The diaryl carbonate used in the present invention is represented by the following formula:

wherein each of $Ar^3$ and $Ar^4$ independently represents a monovalent aromatic group.

Each of $Ar^3$ and $Ar^4$ independently represents a monovalent carbocyclic or heterocyclic aromatic group. At least one hydrogen atom of each of $Ar^3$ and $Ar^4$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group. These groups may or may not be substituted with the above-mentioned substituent or substituents.

Preferred examples of monovalent aromatic groups $Ar^3$ and $Ar^4$ are those respectively represented by the following formulae:

-continued

Representative examples of diaryl carbonates include an unsubstituted or substituted diphenyl carbonate compound represented by the following formula:

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diphenyl carbonate compounds, preferred are diaryl carbonates having a symmetrical configuration, such as (unsubstituted) diphenyl carbonate and a diphenyl carbonate substituted with a lower alkyl group, e.g., ditolyl carbonate and di-t-butylphenyl carbonate. Particularly preferred is diphenyl carbonate, which is the diaryl carbonate having the simplest structure.

These diaryl carbonates may be used individually or in combination.

The ratio in which the aromatic dihydroxy compound and the diaryl carbonate are used (i.e., the charging ratio) may vary depending on the types of the aromatic dihydroxy compound and diaryl carbonate employed, the polymerization temperature and other polymerization conditions. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

The number average molecular weight of the aromatic polycarbonate obtained according to the method of the present invention is generally from 500 to 100,000, preferably from 2,000 to 30,000.

As mentioned above, in the method of the present invention, as a raw material, use is made of at least one polymerizable material selected from the group consisting of:
  a molten monomer mixture of an aromatic dihydroxy compound and a diaryl carbonate, and
  a molten prepolymer obtained by a process comprising reacting an aromatic dihydroxy compound with a diaryl carbonate.

Even when a monomer mixture of an aromatic dihydroxy compound and a diaryl carbonate is simply melted by heating, a polymerization reaction proceeds to some extent. Therefore, a molten monomer mixture of an aromatic dihydroxy compound and a diaryl carbonate is substantially equivalent to a molten prepolymer. In this sense, the polymerizable material is hereinafter, frequently referred to as "prepolymer". Further, when the prepolymer is one which is having its polymerization degree increased by the method of the present invention, the prepolymer is hereinafter, occasionally referred to simply as "polymer".

The molten prepolymer used in the method of the present invention as a polymerizable material may be one obtained by any conventional polymerization method.

The polymerizer apparatus used in the method of the present invention is adapted to be used for performing a guide-wetting fall polymerization reaction in which the polymerizable material is allowed to fall along and in contact with a perforated wall-surface guide having a plurality of through-holes, each extending substantially in the thicknesswise direction of the wall-surface guide, to thereby form openings in both surfaces of the wall-surface guide. It is preferred that the wall-surface of the wall-surface guide is at least one surface selected from the group consisting of a flat surface and a curved surface.

It is preferred that the wall-surface guide used in the method of the present invention has a configuration wherein, when a cross-section of the guide is taken along a plane which extends perpendicularly to the longitudinal axis of the guide and extends horizontally to the wall surface of the guide, the length of the periphery of the cross-section is generally 5 times or greater, more advantageously 10 times or greater, still more advantageously 15 times or greater the thickness-wise length of the cross-section. The above-mentioned lengths of the cross-section of the wall-surface guide are those as measured on the assumption that the wall-surface guide has no hole or projection.

There is no particular limitation with respect to the morphology of the wall-surface guide. For example, the morphology of the wall-surface guide is selected from a plate, a cylinder, a plate having an irregularly curved surface, or the like.

There is no particular limitation with respect to the morphology of the wall-surface of the wall-surface guide. For example, the wall-surface may be flat or curved, and may have projections or the like.

There is no particular limitation with respect to the morphology of each of the openings in both surfaces of the wall-surface guide. For example, the morphology of each of the openings is selected from a rectangle, a square, a trapezoid, a rhombus, a circle, an ellipse, a star and an irregular morphology. Further, these morphologies of the openings can be used individually or in combination.

Figure 1:
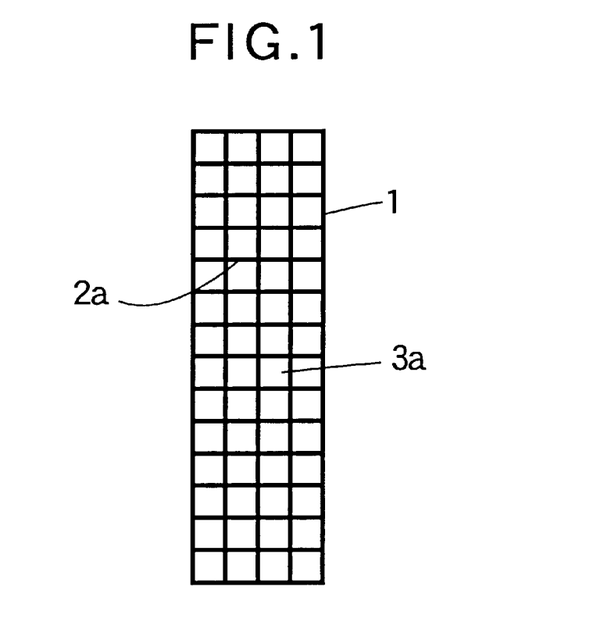
FIG. 1 is a diagrammatic front view of one form of the perforated wall-surface guide used in the present invention.
Figure 2:
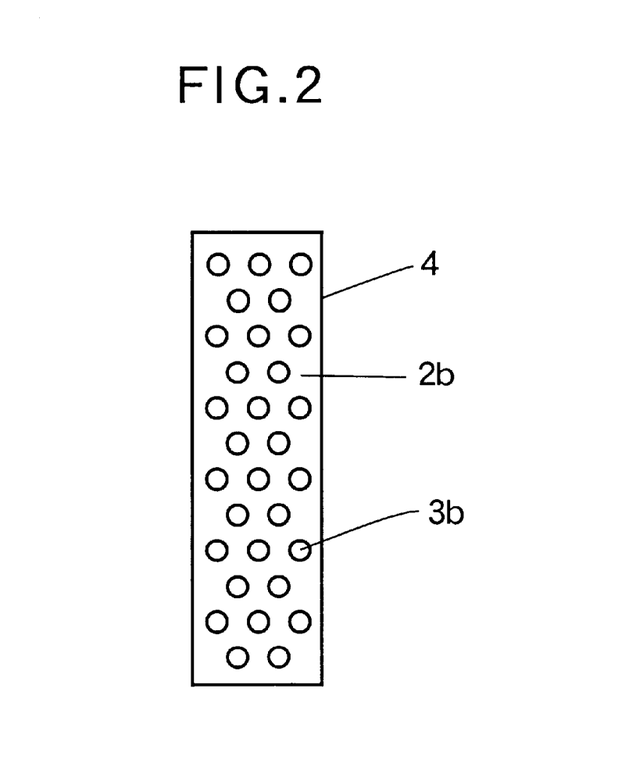
FIG. 2 is a diagrammatic front view of another form of the perforated wall-surface guide used in the present invention.

Examples of forms of the wall-surface guide used in the method of the present invention include a net type form (shown in FIG. 1) and a punched-plate type form (shown in FIG. 2). The wall-surface guides of FIGS. 1 and 2 respectively have openings 3a and 3b and also respectively have free face portions 2a and 2b. In the wall-surface guides of FIGS. 1 and 2, the polymerization of the molten prepolymer proceeds while the molten prepolymer falls along and in contact with free face portions 2a and 2b respectively of the wall-surface guides of FIGS. 1 and 2.

There is no particular limitation with respect to the size of the wall-surface guide. The total area of both surfaces of the wall-surface guide is generally from 0.1 to 100 m², preferably 0.4 to 20 m².

There is no particular limitation with respect to the thickness of the wall-surface guide. The thickness of the wall-surface guide is generally from 0.5 to 200 mm, preferably 1 to 50 mm. When the thickness of the wall-surface guide is relatively large, for preventing a stagnation of the molten prepolymer in the through-holes of the wall-surface guide, it is preferred that the through-holes are inclined.

In the method of the present invention, it is preferred that the wall-surface guide satisfies the following formula (1):

$$S_1/S_0 \geq 0.15 \quad (1)$$

wherein:

$S_0$ represents the total area of both surfaces of the wall-surface guide, as measured without perforation; and $S_1$ represents the total area of the openings in both surfaces of the wall-surface guide.

The above-mentioned ratio $S_1/S_0$ is more preferably from 0.15 to 0.99, still more preferably from 0.35 to 0.97, still more preferably from 0.5 to 0.95. When the ratio $S_1/S_0$ is lower than 0.15, the polymerization rate tends to become low. The reason for this lowering of the polymerization rate has not yet been fully elucidated, but is presumed as follows. A molten prepolymer falling along and in contact with the wall-surface guide is in a film form on each surface of the guide. At each opening in both surfaces of the wall-surface guide, this film of molten prepolymer are in no contact with the wall-surface guide and, hence, both surfaces of this film of molten prepolymer serve to evaporate an aromatic monohydroxy compound from the molten prepolymer. That is, the larger the total area of the openings in both surfaces of the wall-surface guide, the larger the evaporation efficiency of the aromatic monohydroxy compound becomes. Therefore, the higher the ratio $S_1/S_0$, the higher the polymerization rate becomes.

In the present invention, the total area ($S_0$) of both surfaces of the wall-surface guide and the total area ($S_1$) of the openings in both surfaces of the wall-surface guide can be obtained by a projection method, as follows. That is, the wall-surface guide are irradiated with parallel rays (laser light) which are emitted in a direction parallel to the thicknesswise direction of the guide, and the resultant shadow image of the guide is projected onto a projection screen. The total area ($S_0$) of both surfaces of the wall-surface guide and the total area ($S_1$) of the openings in both surfaces of the wall-surface guide are determined from the projected shadow image.

In the method of the present invention, it is preferred that each of the openings in both surfaces of the wall-surface guide independently has an area in the range of from 0.01 to 300 cm$^2$, more advantageously from 0.05 to 150 cm$^2$, still more advantageously from 0.1 to 100 cm$^2$. The area of each of the openings in both surfaces of the wall-surface guide can be determined from a projected shadow image thereof which is obtained by the projection method as described above in connection with the determination of the total area ($S_0$) of both surfaces of the wall-surface guide and the total area ($S_1$) of the openings in both surfaces of the wall-surface guide.

When each of the openings in both surfaces of the wall-surface guide has an area of less than 0.01 cm$^2$, a problem arises in that the molecular weight of the obtained aromatic polycarbonate varies during the polymerization. That is, the molecular weight of the aromatic polycarbonate withdrawn from the outlet of the polymerizer varies in short time spans, for example, in spans of from 1 minute to several tens of minutes, so that an aromatic polycarbonate having a desired constant molecular weight cannot be obtained. The reason for the occurrence of the above-mentioned variation of the molecular weight of the aromatic polycarbonate during the polymerization has not yet been fully elucidated, but is presumed as follows. It is believed that the openings in both surfaces of the wall-surface guide have an effect of stabilizing the flow of the molten prepolymer and for uniformly dispersing the molten prepolymer over the entire surface of the guide. Therefore, when the area of each of the openings in both surfaces of the wall-surface guide is too small, it is likely that the flow of the molten prepolymer not only become unstable, but also do not evenly cover the entire surface of the guide, thus causing an instability in the time (residence time) for which the molten prepolymer is present on the wall-surface guide. In other words, the residence time of the molten prepolymer on the wall-surface guide is likely to have a broad distribution during the polymerization, and this broad distribution of the residence time results in a variation of the molecular weight of the aromatic polycarbonate during the polymerization.

On the other hand, when each of the openings in both surfaces of the wall-surface guide has an area of more than 300 cm$^2$, not only does the polymerization rate become low, but also the molecular weight of the obtained aromatic polycarbonate varies during the polymerization. The reason for the occurrence of these problems is presumed as follows. When the area of each of the openings in both surfaces of the wall-surface guide is too large, it becomes difficult for the molten prepolymer to form and maintain a film over the openings of the guide, so that the molten prepolymer tends to flow down while keeping away from the openings, that is, tends to flow down while making a short pass on the wall-surface guide.

Figure 3:
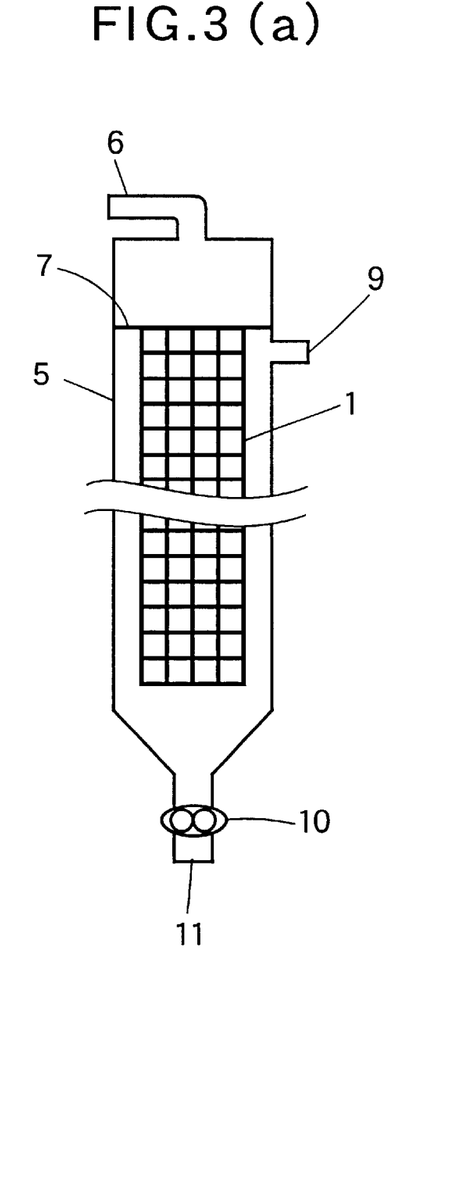

The polymerizer apparatus used in the method of the present invention has, provided therein, one or more perforated wall-surface guides. There is no particular limitation with respect to the manner of securing the wall-surface guide in the polymerizer apparatus. It is preferred that the wall-surface guide is secured in the polymerizer apparatus in a manner wherein the molten prepolymer can make a vertical fall while falling along and in contact with the perforated wall-surface guide. Preferred examples of manners of securing the perforated wall-surface guide in the polymerizer apparatus include a manner in which the wall-surface guide is directly or indirectly secured to distributing plate 7 of the polymerizer apparatus as shown in FIGS. 3(*a*) and 3(*b*), a manner in which the wall-surface guide is secured to a rod projecting from the inside wall of the polymerizer apparatus, and a manner in which the wall-surface guide is secured to a wire suspended from the ceiling wall of the polymerizer apparatus. There is no particular limitation with respect to the method for securing the wall-surface guide in the polymerizer apparatus, and any of conventional methods for securing a guide, such as welding, adhesion, bolting and the like, can be employed.

When a plurality of wall-surface guides are used, the distance between adjacent guides, in terms of the distance between the most closely located portions thereof, is generally in the range of from 0.5 to 30 cm, preferably from 2 to 20 cm, more preferably from 4 to 10 cm. Further, it is preferred that the plurality of wall-surface guides are secured to each other by means of, for example, wires, plates and the like so as to combine the plurality of wall-surface guides into a substantially unified assembly.

There is no particular limitation with respect to the method for allowing the molten prepolymer to fall along and in contact with the wall-surface guide. Usually, the molten prepolymer is transferred to the wall-surface guide through a distributing plate having one or more holes, wherein the distributing plate is provided above the upper end of the wall-surface guide. There is no particular limitation with respect to the morphology of the one or more holes of the distributing plate.

It is also preferred that the wall-surface guide is provided in the polymerizer apparatus so as to be in a position wherein the guide extends through a hole of the distributing plate.

The distributing plate can be selected from various types of plates, such as a flat plate, a corrugated plate, and a plate in which the thickness thereof increases from the periphery toward the central portion. The morphology of the distributing plate is generally selected from a circle, an ellipse, a triangle, a polygon and the like.

The morphology of the holes of the distributing plate is generally selected from a circle, an ellipse, a triangle, a slit, a polygon, a star and the like. The cross-sectional area of each hole of the distributing plate is generally in the range of from 0.01 to 100 cm$^2$, preferably from 0.05 to 10 cm$^2$, especially preferably from 0.1 to 5 cm$^2$. When the distributing plate has a plurality of holes, the distance between adjacent holes, in terms of the distance between the centers of the holes, is usually in the range of from 1 to 500 mm, preferably from 25 to 100 mm. The hole in the distributing plate may be a hole which is made simply by piercing the distributing plate, or may be a hole which is provided by piercing the distributing plate to make a hole and then attaching a pipe to the distributing plate so as to extend downwardly from the hole. Further, the hole of the distributing plate may have a tapered structure in which the diameter of the hole decreases from one opening of the hole to the other opening of the hole.

The term "guide" used in the present invention means a body which has a very large value with respect to the ratio of the length of the body to the average perimeter of a cross-section of the body which cross-section is taken in the direction perpendicular to the lengthwise direction of the body. The above ratio is generally from 10 to 1,000,000, preferably from 50 to 100,000. With respect to the morphology of the cross-section of the guide (which cross-section is taken in the direction perpendicular to the lengthwise direction thereof), there is no particular limitation. Generally, the morphology of the cross-section of the guide is selected from a circle, an ellipse, a triangle, a quadrangle, a polygon, a star and the like. The morphology of the cross-section of the guide may be uniform or varying along the length of the guide. The guide may be hollow.

Examples of methods for passing the molten prepolymer through the above-mentioned distributing plate and allowing the molten prepolymer to fall along and in contact with the wall-surface guide include a method in which the molten prepolymer is allowed to fall by the head, i.e., its own weight, and a method in which the molten prepolymer is forced to fall through the distributing plate by means of a pump or the like.

With respect to the number of the holes of the distributing plate, there is no particular limitation and it varies, depending on various factors, such as the polymerization conditions (such as temperature, pressure and the like), the amount of the catalyst, the molecular weight of the polyearbonate to be produced, and the like. For example, when it is intended to produce an aromatic polycarbonate at a production rate of 100 kg/per hour, the distributing plate should generally have 10 to 105 holes.

It is preferred that the distance for which the molten prepolymer, which is passed through the hole of the distributing plate, is allowed to fall along and in contact with the wall-surface guide is from 0.3 to 50 m, more advantageously from 0.5 to 30 m.

The flow rate of the molten prepolymer passing through the hole of the distributing plate varies, depending on the molecular weight of the molten prepolymer to be produced, but it is usually in the range of from $10^{-4}$ to $10^4$ liters/hr/hole, preferably from $10^{-2}$ to $10^2$ liters/hr/hole, especially preferably from 0.05 to 50 liters/hr/hole. There is no particular limitation with respect to the time for which the molten prepolymer falls along and in contact with the wall-surface guide, but it is generally in the range of from 0.01 second to 10 hours.

The polymer obtained by the guide-wetting fall polymerization reaction of the molten prepolymer may be simply allowed to fall into a polymer reservoir at the bottom of the polymerizer apparatus, or may be forcibly taken into the polymer reservoir by means of a reeling machine or the like.

The polymer obtained at the bottom of the polymerizer apparatus may be withdrawn from the polymerizer apparatus, but it is preferred that the polymer is recirculated through a recirculation line to the inlet of the polymerizer apparatus and again subjected to the guide-wetting fall polymerization reaction. When the obtained polymer is recirculated, the holding time of the polymer both in the polymer reservoir at the bottom of the polymerizer apparatus and in the recirculation line may be appropriately prolonged in accordance with the polymerization reaction time. Further, if desired, the recirculation of the polymer may be started before all of the molten prepolymer has been subjected to the guide-wetting fall polymerization reaction, thereby simultaneously performing the guide-wetting fall polymerization reaction and the recirculation of the polymer. By this embodiment, the surface renewal of the polymer per unit time becomes large, so that it becomes more easy to advance the polymerization and achieve a desired molecular weight.

In the production of an aromatic polycarbonate by the method of the present invention, a single polymerizer which satisfies the requirements of the present invention may be used, or a plurality of such polymerizers may be used. Further, a polymerizer which satisfies the requirements of the present invention may be used in combination with other polymerizers for producing an aromatic polycarbonate. In one preferred mode of the method of the present invention, a molten prepolymer is produced by reacting an aromatic dihydroxy compound with a diaryl carbonate using, for example, a vertical agitation type polymerizer, and then the obtained molten prepolymer is polymerized using a polymerizer which satisfies the requirements of the present invention.

In the method of the present invention for producing an aromatic polycarbonate by reacting an aromatic dihydroxy compound with a diaryl carbonate, the polymerization reaction temperature is generally in the range of from 50 to 350° C., preferably from 100 to 290° C.

As the reaction proceeds, an aromatic monohydroxy compound is by-produced. By removing the aromatic monohydroxy compound from the reaction system, the reaction rate can be increased. Therefore, in the method of the present invention, it is preferred to employ a method in which an inert gas which does not adversely affect the reaction, such as nitrogen, argon, helium, carbon dioxide and a lower hydrocarbon gas, is introduced so that the aromatic monohydroxy compound by-produced is entrained by the inert gas, and the inert gas entraining the aromatic monohydroxy compound is withdrawn to remove the aromatic monohydroxy compound, or a method in which the reaction is carried out under reduced pressure. The above two methods can be used individually or in combination.

A preferred reaction pressure may vary depending on the type of the aromatic polycarbonate to be produced, the molecular weight of the molten monomer mixture or molten prepolymer, and the polymerization temperature. For example, in the case of a reaction in which an aromatic polycarbonate is produced from bisphenol A and diphenyl carbonate, when the number average molecular weight of the molten monomer mixture or molten prepolymer is less than 1,000, the reaction pressure is preferably from 6,660 Pa (50 mmHg) to atmospheric pressure. When the number average molecular weight is from 1,000 to 2,000, the reaction pressure is preferably from 400 to 6,660 Pa (3 to 50 mmHg). When the number average molecular weight is greater than 2,000, the reaction pressure is preferably 2,670 Pa (20 mmHg) or less, more preferably 1,330 Pa (10 mmHg) or less, still more preferably 267 Pa (2 mmHg) or less.

It is particularly preferred that the polymerization is carried out under reduced pressure while introducing an inert gas as mentioned above.

It is also preferred that, as the molten prepolymer, use is made of a molten prepolymer which has been subjected to a pretreatment wherein the molten prepolymer is caused to absorb an inert gas.

The polymerization by the transesterification process may be carried out in the absence of a catalyst. However, when it is desired to accelerate the polymerization rate, the polymerization can be effected in the presence of a catalyst. The polymerization catalysts which are customarily used in the art can be used without particular limitations. Examples of such catalysts include hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethylammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula: $(R^1 R^2 R^3 R^4)PB(R^1 R^2 R^3 R^4)$, wherein $R^1$, $R^2$, $R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxides; and zirconium compounds, such as zirconium acetate, zirconium oxide, zirconium alkoxides, zirconium aryloxides and zirconium acetylacetone, The catalysts can be used individually or in combination. The amount of the catalysts used is generally in the range of from $10^{-8}$ to 1 % by weight, preferably from $10^{-7}$ to $10^{-1}$ % by weight, based on the weight of the aromatic dihydroxy compound.

With respect to materials for the wall-surface guide and polymerizers to be used in the method of the present invention, there is no particular limitation. However, generally, these materials are selected from metals, resins, ceramics and the like. Specific examples of metals and ceramics include stainless steel, nickel and glass.

BEST MODE FOR CARRYING OUT THE INVENTION

The present invention will be further described in more detail with reference to the following Examples and Comparative Examples, which should not be construed as limiting the scope of the present invention.

In the following Examples and Comparative Examples, various properties were measured and evaluated as follows.
(1) Measurement of the Number Average Molecular Weight (Mn) of an Aromatic Polycarbonate:

The number average molecular weight of an aromatic polycarbonate was measured by gel permeation chromatography (GPC) (column: TSK-GEL, manufactured and sold by Tosoh Corp., Japan; solvent: tetrahydrofuran), by the following method. As a sample, a solution of the aromatic polycarbonate in tetrahydrofuran obtained by dissolving 0.8 g of the aromatic polycarbonate in 100 ml of tetrahydrofuran is used. As a calibration curve, a modified calibration curve for a polycarbonate is used, which is obtained by modifying a calibration curve obtained with respect to standard monodisperse polystyrene samples, wherein the modification of the calibration curve is made by a calculation using the following formula:

$$M_{pc} = 0.3591 \, M_{ps}^{1.0388}$$

wherein $M_{pc}$ represents the molecular weight of the polycarbonate, and $M_{ps}$ represents the molecular weight of the standard polystyrene.
(2) Evaluation of the Color of an Aromatic Polycarbonate:

The color of an aromatic polycarbonate was evaluated, using a test specimen having a width of 50 mm, a length of 50 mm and a thickness of 3.2 mm, in accordance with the CIELAB method (Commission Internationale de l'Eclairage 1976 L*a*b* Diagram), wherein the test specimen was obtained by a method in which an aromatic polycarbonate is subjected to continuous molding, using an injection molding machine (J100E, manufactured and sold by THE JAPAN STEEL WORKS. LTD., Japan), at a cylinder temperature of 290° C. and a mold temperature of 90° C. The yellowness of the specimen was expressed in terms of the b*-value.
(3) Measurement of the Amount of Foreign Matter Contained in an Aromatic Polycarbonate:

The content of the foreign matter (having a particle diameter of from 0.5 to 20 μm) contained in the produced aromatic polycarbonate was measured by means of a counter for particles in a liquid (HIAC/ROYCO MODEL 346B manufactured and sold by Pacific Scientific Ltd., England). The measurement was conducted with respect to a solution of the aromatic polycarbonate in methylene chloride.

EXAMPLE 1

A polymerization reaction was carried out using a cylindrical polymerizer 5 as shown in FIG. 3(*a*). Polymerizer 5 has an inner diameter of 0.3 m, and is equipped with two perforated wall-surface guides 1, 1 and distributing plate 7, wherein the top end of each guide 1 is directly fixed to distributing plate 7. Each guide 1 is comprised of a network structure which has a width of 10.3 cm, a height of 8 m and a line pitch of 2.5 cm and which is made of a wire having a diameter of 3 mm. The interval between two guides 1, 1 is 80 mm. The area of each of the openings of guide 1 is 4.84 cm$^2$, and $S_1/S_0$ ratio (i.e., the ratio of the total area $S_1$ of the openings in both surfaces of guide 1 to the total area $S_0$ of both surfaces of guide 1) is 0.75.

Distributing plate 7 has ten holes 8 each having a diameter of 3 mm (see FIG. 3(b)). As seen from FIG. 3(b), through distributing plate 7, a molten prepolymer fed to polymerizer 5 can be distributed to perforated wall-surface guides 1, 1 so that the distributed prepolymer can be caused to uniformly fall along and in contact with the surfaces of both opposite sides of each of perforated wall-surface guides 1, 1. Further, polymerizer 5 has an external jacket (not shown), and the inside of polymerizer 5 is heated by passing a heating medium through the jacket.

A mixture of bisphenol A, diphenyl carbonate (the molar ratio of diphenyl carbonate to bisphenol A: 1.06) and sodium hydroxide ($3 \times 10^{-6}$ mole per kg of bisphenol A) was charged into a vertical agitation type polymerizer vessel, and melted in an atmosphere of nitrogen at 180° C., thereby obtaining a molten mixture. The obtained molten mixture was subjected to polymerization reaction while stirring for 1 hour under conditions wherein the temperature was 230° C. and the pressure was 9,300 Pa, and the resultant reaction mixture was then further subjected to reaction while stirring for 2 hours under conditions wherein the temperature was 270° C. and the pressure was 1,000 Pa. Subsequently, the pressure was raised to atmospheric pressure by introducing nitrogen gas into the polymerizer vessel, and the reaction mixture was further stirred for 1 hour to thereby obtain a molten prepolymer having a number average molecular weight (hereinbelow, frequently referred to as "Mn") of 4,000.

The obtained molten prepolymer was continuously fed to polymerizer 5 through inlet 6 at a flow rate of 20 kg/hr and allowed to fall along and in contact with perforated wall-surface guides 1, 1, so that a polymerization reaction of the molten prepolymer was carried out under polymerization reaction conditions wherein the reaction temperature was 270° C. and the reaction pressure was 100 Pa, while continuously withdrawing a produced aromatic polycarbonate from outlet 11 by means of discharge pump 10.

50 hours after the start of the polymerization reaction, with respect to the produced aromatic polycarbonate withdrawn from polymerizer 5, a sampling thereof was started wherein 10 samples of the produced polycarbonate were taken at intervals of 5 minutes and subjected to measurement of Mn. It was found that the average Mn was 11,500, the minimum Mn was 11,400, the maximum Mn was 11,700 and the difference between the maximum and minimum Mn values was 300.

The aromatic polycarbonate obtained 50 hours after the start of the polymerization reaction was colorless and transparent (b*-value: 3.4), and the content of the foreign matter (having a diameter of from 0.5 to 20 μm) in the aromatic polycarbonate was as low as 970 pieces/g.

Examples 2 to 10

An aromatic polycarbonate was produced in substantially the same manner as in Example 1, except that the following factors were varied: the width, height and line pitch of perforated wall-surface guide 1, the diameter of the wire of which the guide is made, and the reaction temperature and pressure. The polymerization conditions and the results are shown in Table 1.

Comparative Example 1

An aromatic polycarbonate was produced in substantially the same manner as in Example 1, except that, instead of the two wall-surface guides used in Example 1, use was made of two wall-surface guides each of which is a flat plate of SUS316 having a width of 10.3 cm, a height of 8 m and a thickness of 3 mm.

50 hours after the start of the polymerization reaction, with respect to the produced aromatic polycarbonate withdrawn from the polymerizer, a sampling thereof was started wherein 10 samples of the produced polycarbonate were taken at intervals of 5 minutes and subjected to measurement of Mn. It was found that the average Mn was 9,570, the minimum Mn was 9,100, the maximum Mn was 10,000 and the difference between the maximum and minimum Mn values was 900.

The aromatic polycarbonate obtained 50 hours after the start of the polymerization reaction was colorless and transparent (b*-value: 3.4), and the content of the foreign matter (having a diameter of from 0.5 to 20 μm) in the aromatic polycarbonate was as low as 980 pieces/g.

Comparative Example 2

An aromatic polycarbonate was produced in substantially the same manner as in Example 1, except that, instead of the two wall-surface guides used in Example 1, use was made of 10 wire guides of SUS316 each of which has a diameter of 3 mm and a length of 8 m, wherein the 10 wire guides are hung vertically from the 10 holes of the distributing plate so that the top end of each guide is positioned just under the center of a hole of the distributing plate.

50 hours after the start of the polymerization reaction, with respect to the produced aromatic polycarbonate withdrawn from the polymerizer, a sampling thereof was started wherein 10 samples of the produced polycarbonate were taken at intervals of 5 minutes and subjected to measurement of Mn. It was found that the average Mn was 9,480, the minimum Mn was 9,000, the maximum Mn was 10,000 and the difference between the maximum and minimum Mn values was 1,000.

The aromatic polycarbonate obtained 50 hours after the start of the polymerization reaction was colorless and transparent (b*-value: 3.4), and the content of the foreign matter (having a diameter of from 0.5 to 20 μm) in the aromatic polycarbonate was as low as 970 pieces/g.

Comparative Example 3

An aromatic polycarbonate was produced in substantially the same manner as in Example 1, except that, instead of polymerizer 5, a horizontal agitation type polymerizer vessel was used. More specifically, a polymerization reaction was conducted by a method in which a molten prepolymer prepared in substantially the same manner as in Example 1 is continuously fed to a horizontal agitation type polymerizer vessel (length: 6 m) which is equipped with two agitators (rotation diameter of each agitator: 0.25 m). The polymerization reaction was conducted under conditions wherein the flow rate of the prepolymer, the reaction temperature and the reaction pressure were the same as in Example 1, and the revolution rate of each agitator was 10 rpm.

50 hours after the start of the polymerization reaction, with respect to the produced aromatic polycarbonate withdrawn from the polymerizer, a sampling thereof was started wherein 10 samples of the produced polycarbonate were taken at intervals of 5 minutes and subjected to measurement of Mn. It was found that the average Mn was 7,490, the minimum Mn was 7,200, the maximum Mn was 7,700 and the difference between the maximum and minimum Mn values was 500.

The aromatic polycarbonate obtained 50 hours after the start of the polymerization reaction suffered from discoloration (b*-value: 3.8), and the content of the foreign matter (having a diameter of from 0.5 to 20 μm) in the aromatic polycarbonate was 4,800 pieces/g.

Example 11

An aromatic polycarbonate was produced in substantially the same manner as in Example 1, except that, instead of the two wall-surface guides used in Example 1, use was made of two punched-plate type wall-surface guides as shown in FIG. 2.

Each of the guides has 228 circular through-holes each having a diameter of 3 cm, wherein the through-holes of the guides are arranged in a zigzag configuration in which the pitch (i.e., the interval between the centers of the adjacent through-holes) is 6 cm. The area of each of the openings in both surfaces of each guide is 7.07 cm$^2$, and $S_1/S_0$ ratio (i.e., the ratio of the total area $S_1$ of the openings in both surfaces of each guide to the total area So of both surfaces of each guide) is 0.17.

50 hours after the start of the polymerization reaction, with respect to the produced aromatic polycarbonate withdrawn from the polymerizer, a sampling thereof was started wherein 10 samples of the produced polycarbonate were taken at intervals of 5 minutes and subjected to measurement of Mn. It was found that the average Mn was 11,370, the minimum Mn was 11,200, the maximum Mn was 11,550 and the difference between the maximum and minimum Mn values was 350.

The aromatic polycarbonate obtained 50 hours after the start of the polymerization reaction was colorless and transparent (b*-value: 3.4), and the content of the foreign matter (having a diameter of from 0.5 to 20 μm) in the aromatic polycarbonate was as low as 990 pieces/g.

Examples 12 to 15

An aromatic polycarbonate was produced in substantially the same manner as in Example 11, except that the following factors were varied: the diameter of the openings in both surfaces of each guide, and the pitch and number of the through-holes of each guide. The polymerization conditions and the results are shown in Table 2.

Example 16

A mixture of bisphenol A, diphenyl carbonate (the molar ratio of diphenyl carbonate to bisphenol A: 1.06) and sodium hydroxide (3×10$^{-6}$ mole per kg of bisphenol A) was charged into a vertical agitation type polymerizer vessel, and melted in an atmosphere of nitrogen at 180 ° C., thereby obtaining a molten mixture. The obtained molten mixture was subjected to polymerization reaction while stirring for 1 hour under conditions wherein the temperature was 230° C. and the pressure was 9,300 Pa, and the resultant reaction mixture was then further subjected to reaction while stirring for 2 hours under conditions wherein the temperature was 270° C. and the pressure was 3,300 Pa. Subsequently, the pressure was raised to atmospheric pressure by introducing nitrogen gas into the polymerizer vessel, and the reaction mixture was further stirred for 1 hour to thereby obtain a molten prepolymer having an Mn of 2,500.

Using the obtained molten prepolymer, an aromatic polycarbonate was produced in substantially the same manner as in Example 1, except that the reaction pressure was 150 Pa.

50 hours after the start of the polymerization reaction, with respect to the-produced aromatic polycarbonate withdrawn from the polymerizer, a sampling thereof was started wherein 10 samples of the produced polycarbonate were taken at intervals of 5 minutes and subjected to measurement of Mn. It was found that the average Mn was 9,320, the minimum Mn was 9,250, the maximum Mn was 9,400 and the difference between the maximum and minimum Mn values was 150.

The aromatic polycarbonate obtained 50 hours after the start of the polymerization reaction was colorless and transparent (b*-value: 3.4), and the content of the foreign matter (having a diameter of from 0.5 to 20 μm) in the aromatic polycarbonate was as low as 960 pieces/g.

Example 17

An aromatic polycarbonate was produced in substantially the same manner as in Example 1, except that, instead of the molten prepolymer used in Example 1, use was made of a molten prepolymer having an Mn of 4,000 which was prepared in substantially the same manner as in Example 1, except that 1,1-bis(4-hydroxyphenyl)-3,3,5-trimethylcyclohexane was used in place of bisphenol A. 50 hours after the start of the polymerization reaction, with respect to the produced aromatic polycarbonate withdrawn from the polymerizer, a sampling thereof was started wherein 10 samples of the produced polycarbonate were taken at intervals of 5 minutes and subjected to measurement of Mn. It was found that the average Mn was 11,120, the minimum Mn was 10,900, the maximum Mn was 11,300 and the difference between the maximum and minimum Mn values was 400.

The aromatic polycarbonate obtained 50 hours after the start of the polymerization reaction was colorless and transparent (b*-value: 3.5), and the content of the foreign matter (having a diameter of from 0.5 to 20 μm) in the aromatic polycarbonate was as low as 1,050 pieces/g.

Example 18

An aromatic polycarbonate was produced in substantially the same manner as in Example 1, except that, instead of the molten prepolymer used in Example 1, use was made of a molten prepolymer having an Mn of 4,000 which was prepared in substantially the same manner as in Example 1, except that 1,1-bis(3,5-dimethyl-4-hydroxyphenyl)sulfone was used in place of bisphenol A.

50 hours after the start of the polymerization reaction, with respect to the produced aromatic polycarbonate withdrawn from the polymerizer, a sampling thereof was started wherein 10 samples of the produced polycarbonate were taken at intervals of 5 minutes and subjected to measurement of Mn. It was found that the average Mn was 11,030, the minimum Mn was 10,800, the maximum Mn was 11,200 and the difference between the maximum and minimum Mn values was 400.

The aromatic polycarbonate obtained 50 hours after the start of the polymerization reaction was colorless and transparent (b*-value: 3.5), and the content of the foreign matter (having a diameter of from 0.5 to 20 μm) in the aromatic polycarbonate was as low as 1,250 pieces/g.

TABLE 1

| | Molten prepolymer | | Polymerization conditions | | Net type wall-surface guide | | | | | | Aromatic polycarbonate | | | | | Foreign matter |
| --- | --- | --- | --- | --- | --- | --- | --- | --- | --- | --- | --- | --- | --- | --- | --- | --- |
| | | | | | | | | Diam- | Line | Area of | | $Mn^{1)}$(10-times sampling) | | | | |
| Ex- am- ples | $Mn^{1)}$ | Flow rate (kg/hr) | Temper- ature (° C.) | Pres- sure (Pa) | Width (cm) | Height (m) | eter of wire (mm) | pitch (cm) | opening ($cm^{2/o-}$ pening) | $S_1/S_0$ | Average value | Mini- mum value | Maxi- mum value | Differ- ence[2] | b* value | content (pieces /g) |
| 1 | 4000 | 20 | 270 | 100 | 10.3 | 8 | 3 | 2.5 | 4.84 | 0.75 | 11500 | 11400 | 11700 | 300 | 3.4 | 970 |
| 2 | 4000 | 25 | 280 | 110 | 10.3 | 8 | 3 | 5.0 | 22.1 | 0.86 | 11210 | 11050 | 11400 | 350 | 3.4 | 990 |
| 3 | 4000 | 20 | 270 | 100 | 10.3 | 8 | 3 | 10 | 94.1 | 0.91 | 11130 | 10900 | 11300 | 400 | 3.4 | 990 |
| 4 | 4000 | 20 | 270 | 100 | 10.3 | 8 | 3 | 1 | 0.49 | 0.48 | 11100 | 10850 | 11300 | 450 | 3.4 | 980 |
| 5 | 4000 | 20 | 270 | 100 | 10.3 | 8 | 3 | 0.5 | 0.04 | 0.16 | 10540 | 10200 | 10800 | 600 | 3.4 | 990 |
| 6 | 4000 | 16 | 260 | 90 | 10.5 | 8 | 5 | 2.5 | 4 | 0.61 | 11020 | 10900 | 11200 | 300 | 3.4 | 960 |
| 7 | 4000 | 16 | 260 | 90 | 10.5 | 8 | 5 | 1 | 0.25 | 0.24 | 10300 | 10000 | 10550 | 550 | 3.4 | 980 |
| 8 | 4000 | 16 | 260 | 90 | 20.5 | 5 | 5 | 20 | 380 | 0.93 | 10100 | 9800 | 10500 | 700 | 3.4 | 980 |
| 9 | 4000 | 16 | 280 | 90 | 10.3 | 8 | 3 | 2.5 | 4.84 | 0.75 | 12910 | 12700 | 13100 | 400 | 3.4 | 990 |
| 10 | 4000 | 25 | 250 | 100 | 10.3 | 8 | 3 | 2.5 | 4.84 | 0.75 | 9010 | 8950 | 9100 | 150 | 3.3 | 960 |

Note [1] Mn: Number average molecular weight.
Note [2] Difference between the maximum and minimum number average molecular weights.

TABLE 2

| | Molten prepolymer | | Poly- merization conditions | | Punched-plate type wall-surface guide | | | | | Aromatic polycarbonate | | | | | Foreign matter |
| --- | --- | --- | --- | --- | --- | --- | --- | --- | --- | --- | --- | --- | --- | --- | --- |
| | | | | | Diameter | Pitch of | | Area of | | | $Mn^{1)}$(10-times sampling) | | | | |
| Ex- am- ples | $Mn^{1)}$ | Flow rate (kg/hr) | Tem- per- ature (° C.) | Pres- sure (Pa) | of opening (cm) | through- holes (cm) | Number of through- holes | opening ($cm^{2/o-}$ pening) | $S_1/S_0$ | Average value | Mini- mum value | Maxi- mum value | Differ- ence[2] | b* value | content (pieces /g) |
| 11 | 4000 | 20 | 270 | 100 | 3 | 6 | 228 | 7.07 | 0.17 | 11370 | 11200 | 11550 | 350 | 3.4 | 990 |
| 12 | 4000 | 20 | 270 | 100 | 4 | 6 | 228 | 12.56 | 0.3 | 11520 | 11350 | 11700 | 350 | 3.4 | 990 |
| 13 | 4000 | 20 | 270 | 100 | 1 | 6 | 228 | 0.785 | 0.019 | 10030 | 9700 | 10300 | 600 | 3.4 | 990 |
| 14 | 4000 | 20 | 270 | 100 | 0.1 | 6 | 228 | 0.00785 | 0.0002 | 9700 | 9300 | 10100 | 800 | 3.4 | 980 |
| 15 | 4000 | 20 | 270 | 100 | 1 | 3 | 1071 | 0.785 | 0.0875 | 10380 | 10100 | 10600 | 500 | 3.4 | 990 |

Note[1] Mn: Number average molecular weight.
Note [2] Difference between the maximum and minimum number average molecular weights.

INDUSTRIAL APPLICABILITY

The method of the present invention for producing an aromatic polycarbonate is free from the problems accompanying the conventional methods, such as the problem that: phenol cannot be removed efficiently; a very large motive power for agitation is needed; the molecular chain of a polymer being formed is broken by a large shearing force due to the very large motive power for agitation, resulting not only in a lowering of the increasing rate of the molecular weight but also in a discoloration of the polymer; the polymer is likely to suffer thermal decomposition due to a long-term thermal history, thereby inevitably causing the polymer being produced to contain thermal decomposition products; and the volumetric efficiency of a polymerizer is extremely low.

By the method of the present invention, an aromatic polycarbonate having a desired constant molecular weight can be stably produced at a high polymerization rate, without discoloration with respect to the polymer or generation of foreign matter. Therefore, the method of the present invention is advantageous from a commercial viewpoint.

What is claimed is:

1. A method for producing an aromatic polycarbonate, which comprises:

feeding, into a polymerizer apparatus, at least one polymerizable material selected from the group consisting of:

a molten monomer mixture of an aromatic dihydroxy compound and a diaryl carbonate, and a molten prepolymer produced by a process comprising reacting an aromatic dihydroxy compound with a diaryl carbonate, said polymerizer apparatus comprising an inlet for said polymerizable material, a polymerizable material feeding zone communicating with said inlet, and a guide-wetting fall polymerization reaction zone which is positioned below and communicates with said polymerizable material feeding zone, wherein said guide-wetting fall polymerization reaction zone has at least one guide securely held therein and extending downwardly therethrough, and allowing said polymerizable material to fall along and in contact with said at least one guide through said guide-wetting fall polymerization reaction zone, to effect a guide-wetting fall polymerization of said polymerizable material, thereby obtaining a polymer at a bottom of said guide-wetting fall polymerization reaction zone, wherein said guide is a perforated wall-surface guide, said perforated wall-surface guide having a plurality of through-holes, each extending substantially in the thicknesswise direction of said wall-surface guide, to thereby form openings in both surfaces of said wall-surface guide.

2. The method according to claim 1, wherein said wall-surface guide satisfies the following formula (1):

$$S_1/S_0 \geqq 0.15 \tag{1}$$

wherein:

$S_0$ represents the total area of both surfaces of said wall-surface guide, as measured without perforation; and $S_1$ represents the total area of the openings in both surfaces of said wall-surface guide.

3. The method according to claim 1, wherein each of said openings in both surfaces of said wall-surface guide independently has an area in the range of from 0.01 to 300 cm$^2$.

4. The method according to claim 1, wherein the wall-surface of said wall-surface guide is at least one surface selected from the group consisting of a flat surface and a curved surface.

5. A polymerizer apparatus for producing an aromatic polycarbonate, which comprises a casing and, provided therein, an inlet for a polymerizable material, a polymerizable material feeding zone communicating with said inlet, and a guide-wetting fall polymerization reaction zone which is positioned below and communicates with said polymerizable material feeding zone, wherein said guide-wetting fall polymerization reaction zone has at least one guide securely held therein and extending downwardly therethrough, wherein said polymerizable material is at least one member selected from the group consisting of:

a molten monomer mixture of an aromatic dihydroxy compound and a diaryl carbonate, and a molten prepolymer produced by a process comprising reacting an aromatic dihydroxy compound with a diaryl carbonate, and wherein when said polymerizable material is introduced to said inlet, said polymerizable material is fed to said polymerizable material feeding zone, and transferred to enter said guide-wetting fall polymerization reaction zone through said polymerizable material feeding zone and fall along and in contact with said guide, to effect a guide-wetting fall polymerization of said polymerizable material to obtain a polymer, said guide-wetting fall polymerization reaction zone having, at a bottom thereof, an outlet for said obtained polymer, wherein said guide is a perforated wall-surface guide, said perforated wall-surface guide having a plurality of through-holes, each extending substantially in the thicknesswise direction of said wall-surface guide, to thereby form openings in both surfaces of said wall-surface guide.

6. The polymerizer apparatus according to claim 5, wherein said polymerizable material feeding zone and said guide-wetting fall polymerization reaction zone are separated from each other through a polymerizable material distributing plate having at least one hole, said feeding zone communicating with said guide-wetting fall polymerization reaction zone through said at least one hole, and wherein said guide is arranged in correspondence with the hole of said distributing plate.

7. The polymerizer apparatus according to claim 5, wherein said wall-surface guide satisfies the following formula (1):

$$S_1/S_0 \geqq 0.15 \tag{1}$$

wherein:

$S_0$ represents the total area of both surfaces of said wall-surface guide, as measured without perforation; and $S_1$ represents the total area of the openings in both surfaces of said wall-surface guide.

8. The polymerizer apparatus according to claim 5. wherein each of said openings in both surfaces of said wall-surface guide independently has an area in the range of from 0.01 to 300 cm$^2$.

9. The polymerizer apparatus according to claim 5, wherein the wall-surface of said wall-surface guide is at least one surface selected from the group consisting of a flat surface and a curved surface.

* * * * *